(12) United States Patent
Noroozi et al.

(10) Patent No.: US 11,921,817 B2
(45) Date of Patent: Mar. 5, 2024

(54) UNSUPERVISED TRAINING OF A VIDEO FEATURE EXTRACTOR

(71) Applicant: Robert Bosch GmbH, Stuttgart (DE)

(72) Inventors: Mehdi Noroozi, Leonberg (DE); Nadine Behrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 351 days.

(21) Appl. No.: 17/449,184

(22) Filed: Sep. 28, 2021

(65) Prior Publication Data

US 2022/0129699 A1 Apr. 28, 2022

(30) Foreign Application Priority Data

Oct. 26, 2020 (EP) ..................................... 20203782

(51) Int. Cl.
*G06F 18/214* (2023.01)
*G06N 3/04* (2023.01)
*G06N 3/088* (2023.01)
*G06V 10/75* (2022.01)
*G06V 10/94* (2022.01)
*G06V 20/40* (2022.01)

(52) U.S. Cl.
CPC ............. *G06F 18/214* (2023.01); *G06N 3/04* (2013.01); *G06N 3/088* (2013.01); *G06V 10/751* (2022.01); *G06V 10/95* (2022.01); *G06V 20/46* (2022.01)

(58) Field of Classification Search
CPC ........ G06F 18/214; G06N 3/04; G06N 3/088; G06N 3/044; G06N 3/045; G06V 10/751; G06V 10/95; G06V 20/46; G06V 10/764; G06V 10/454; G06V 20/52; G06V 20/58

USPC ......................................................... 382/157
See application file for complete search history.

(56) References Cited

U.S. PATENT DOCUMENTS

2016/0343135 A1* 11/2016 De Haan ............ A61B 5/02416
2019/0228313 A1 7/2019 Lee et al.

FOREIGN PATENT DOCUMENTS

WO 2019071094 A1 4/2019

OTHER PUBLICATIONS

Han et al., "Video Representation Learning By Dense Predictive Coding," Cornell University, 2019, pp. 1-13. <https://arxiv.org/pdf/1909.04656.pdf> Downloaded Sep. 27, 2021.

(Continued)

*Primary Examiner* — Stephen P Coleman
(74) *Attorney, Agent, or Firm* — NORTON ROSE FULBRIGHT US LLP; Gerard A. Messina

(57) ABSTRACT

A computer-implemented unsupervised learning method of training a video feature extractor. The video feature extractor is configured to extract a feature representation from a video sequence. The method uses training data representing multiple training video sequences. From a training video sequence of the multiple training video sequences, a current subsequence; a preceding subsequence preceding the current subsequence; and a succeeding subsequence succeeding the current subsequence are selected. The video feature extractor is applied to the current subsequence to extract a current feature representation of the current subsequence. A training signal is derived from a joint predictability of the preceding and succeeding subsequences given the current feature representation. The parameters of the video feature extractor are updated based on the training signal.

14 Claims, 6 Drawing Sheets

(56) References Cited

OTHER PUBLICATIONS

Kingma et al., "Adam: A Method for Stochastic Optimization," Cornell University, 2017, pp. 1-15. <https://arxiv.org/pdf/1412.6980.pdf> Downloaded Sep. 27, 2021.
Yao et al., "SECO: Exploring Sequence Supervision for Unsupervised Representation Learning," Cornell University, 2020, pp. 1-9.
Hou et al., "Tube Convolutional Neural Network (T-CNN) for Action Detection in Videos," Cornell University, 2017, pp. 1-11.

\* cited by examiner

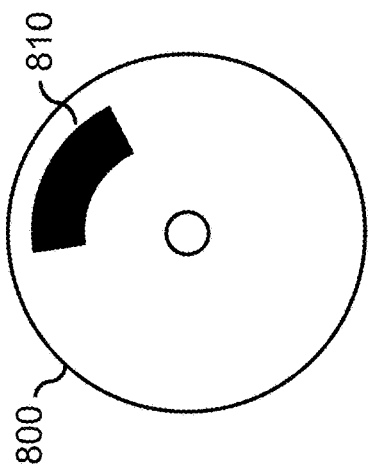
Fig. 8
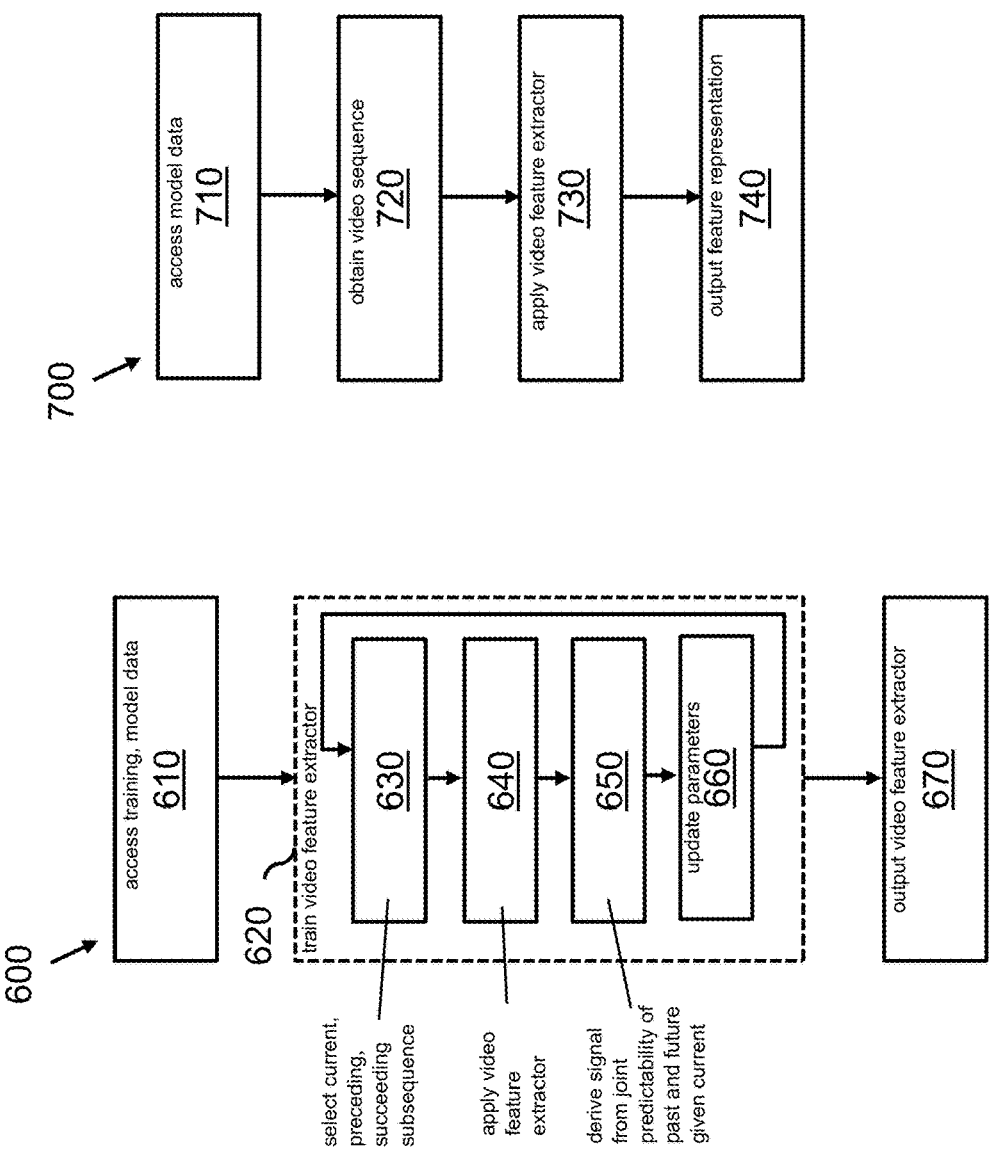
Fig. 7
Fig. 6

UNSUPERVISED TRAINING OF A VIDEO FEATURE EXTRACTOR

CROSS REFERENCE

The present application claims the benefit under 35 U.S.C. 119 of European Patent Application EP 20203782.6 filed on Oct. 26, 2020, which is expressly incorporated herein by reference in its entirety.

FIELD

The present invention relates to a computer-implemented method of training a video feature extractor, and to a corresponding system. The present invention also relates to a computer-implemented method of extracting a feature representation from a video sequence, and to a corresponding system. The present invention further relates to a computer-readable medium.

BACKGROUND INFORMATION

Video feature extraction is an important task in machine learning with myriad applications. For example, modern vehicles are equipped with multiple cameras that capture videos of the environment around them. These videos represent information about the traffic situation around the vehicle that is useful for example for autonomously driving the vehicle, or for assisting the driver, e.g., in the case of semi-autonomous driving, or for parking assistance. Also in surveillance systems and robotic systems, video data represents information concerning how machines interact with each other and their environment that is useful for monitoring and/or controlling the system.

In order to use video data in upstream applications, such as monitoring or control, it is important to have high-quality video feature extractors that extract meaningful features from the video data. To obtain such a video feature extractor, it is typically trained on training data representing a number of representative video sequences. Such training is generally preferred to be unsupervised. An advantage of unsupervised learning is that it alleviates the cost and error of the labelling process. Moreover, learning generalizable and optimal features cannot be taken for granted in a supervised setting, especially for complex sources of information like videos. For instance, for the problem of learning action labels from video, these action labels can already be predicted from a single frame to such a degree, that using the action labels as feedback provides only a weak supervision signal for representation learning. Effectively, the model is not sufficiently forced to explore the temporal information of the videos. In contrast to the image domain where the gap between unsupervised and supervised representation learning has been shrunk remarkably, the performance of unsupervised video representation is still unsatisfactory.

A conventional technique for unsupervised training of a video feature extractor is described in T. Han et al., "Video Representation Learning by Dense Predictive Coding" (available at https://arxiv.org/abs/1909.04656 and incorporated herein by reference). In particular, this is a self-supervised learning technique in which a dense encoding of spatio-temporal blocks is learned by using the prediction of future representations as a pretext task. To optimize this task, a loss based on Noise Contrastive Estimation (NCE) is used. At each spatial location of the predicted feature map, a "positive pair", consisting of the predicted feature and the representation extracted by the feature extractor, is compared with easy negatives in which the predicted feature is compared to features from different videos; with spatial negatives in which it is compared to features at different spatial positions; and with temporal negatives in which it is compared to features from different time steps. The loss encourages the positive pair to have higher similarity than any of the negative pairs.

SUMMARY

It would be desirable to have a video extractor that extract more high-quality features from a video sequence, and that as a consequence, allows the video sequence to be more effectively used in upstream applications. In particular, it would be desirable to have a video extractor that extracts better temporal information from the video sequence. In particular, it would be desirable to provide improved techniques for training such a video extractor by unsupervised learning, for example, unsupervised learning techniques that can more efficiently and effectively extract temporal information from video sequences.

In accordance with a first aspect of the present invention, a computer-implemented method and a corresponding system are provided for training a video feature extractor. In accordance with a further aspect of the present invention, a computer-implemented method and a corresponding system are provided for extracting a feature representation from a video sequence. In accordance with an aspect of the present invention, a computer-readable medium is provided.

In accordance with an example embodiment of the present invention, various measures involve training a video feature extractor by unsupervised learning. In accordance with an example embodiment of the present invention, various measures also relate to the use of such a trained video feature extractor. The video feature extractor may be trained to extract feature representations from video sequences, based on training data that represents multiple training video sequences. The training data may be unlabelled in the sense that it does not comprise target feature representations that the video feature extractor is trained to approximate, e.g., the video feature extractor is not trained to approximate human-annotated semantic labels. Instead, the video feature extractor may be trained to extract meaningful feature representations by training on a pre-text task, in other words, by deriving a training signal for an extracted feature representation that is expected to be indicative of its quality, without comparing the feature representation to a ground truth. Such training is also referred to as self-supervised learning.

To improve the quality of the extracted features, it is important to encourage the feature extractor to encode temporal aspects of the video. Unless the model is specifically encouraged, it turns out that in many cases temporal aspects are discarded. In order to encourage temporal aspects to be taken into account, the inventors provide for considering the relation between a segment of video and what happens before and after. As the inventors realized, given a segment of a video as a current sequence, the question of what will happen in successive frames is comparable to asking what has happened in the preceding frames in terms of factors of variation which the network is intended to encode. Nonetheless, it is not evident how both the succeeding and the preceding frames can be utilized effectively in a comprehensively challenging training task.

Interestingly, the inventors found an effective way of using past and future, namely, by using joint prediction of past and future as a pretext task. This may involve selecting, from a training video sequence, a current subsequence, a preceding subsequence preceding the present subsequence, and a succeeding subsequence succeeding the present subsequence. The video feature extractor may be applied to the current subsequence to extract a current feature representation of the current subsequence. To estimate the quality of that current feature representation, a joint predictability of the preceding and succeeding subsequences given the current feature representation may be estimated. In other words, a predictability of the joint distribution of the preceding and succeeding subsequences (e.g., as an ordered pair) given the current feature representation may be estimated.

Instead of "current", "preceding", and "succeeding", throughout this specification also the terms "present", "past", and "future" are used with the same meaning. For example, current, preceding, and succeeding subsequences are referred to herein as present, past, and future subsequences, respectively. The terms "past", "present", and "future" are used purely as terms relative to each other and not, e.g., to the time at which the described systems or methods are used.

From the estimated joint predictability, a training signal may be derived that is used to train the video feature extractor by encouraging the video feature extractor to increase the joint predictability. Interestingly, since the past and future are both included in the same joint distribution, the predictability of this distribution increases if the present feature representation takes into account temporal aspects of the video. Thus, the training signal encourages the extraction of features to put more emphasis on the temporal structure in video data, which may otherwise be discarded.

Joint prediction of past and future was found to provide high-quality feature extraction, and to outperform several alternatives that may be considered. In particular, an alternative way in which future and past video sequences may be used, is by combining prediction of past and future feature disjointly, e.g., by unidirectionally predicting past and future features independently and for example adding the two resulting losses. The inventors realized, and also confirmed experimentally, that this is not an effective way to use past and future. An explanation may be that disjoint prediction of past and future does not introduce a new set of negatives compared to individual prediction of future or past. Predicting unobserved past rather than future may use similar representations. For example, given the present video subsequence, distinguishing between a random video subsequence and the future subsequence may use similar attributes as distinguishing between a random video subsequence and the past subsequence. Thus, disjoint prediction of future and past may not be expected to improve extracted feature representations as much as considering a joint distribution of past and future subsequences. Effectively, there may not be a strong enough training signal to force the feature extractor to distinguish between past and future.

Another alternative way of using future and past video sequences, is by deriving a training signal based on distinguishing between past and future subsequences, e.g., by including past subsequences as negatives in a contrastive loss. However, the inventors realized, and also experimentally confirmed, that this does not lead to an effective use of past and future either. Essentially, past features should encode similar high-level abstractions as those of the future, e.g., an action being performed in the video. When using such a contrastive loss that uses past subsequences as negatives, the training may result in a degenerate solution that removes such meaningful features that are shared across past, present and future from the extracted feature representations.

Interestingly, by using a joint distribution of past and future subsequences, both of these aspects can be taken into account. Given a present subsequence, it is desirable for the features of both future and past to be distinguishable from random, but it is also desirable for future and past to be distinguishable from each other. By considering joint predictions, both supervisory signals can be exploited, since joint predictability of the past and future subsequences entails that the right combination of past and future is both distinguishable from random and from the wrong combination in which past and future are swapped. Accordingly, the supervisory signal arising from unobserved past frames can be used complementarily to one that originates from the future frames. Thereby, a training signal is provided that effectively encourages the video feature extractor to explore the temporal structure of videos.

Accordingly, training based on this training signal leads to a feature extractor that provides more high-quality feature representations, and thus also to improved performance for upstream tasks that use the extracted feature representations. Still, the training can be performed on unlabelled data. Data and annotations are critical bottlenecks in training machine learning models, e.g., deep neural networks. The provided techniques can facilitate the training by learning representations from unlabelled video. The learned representation can be transferred to downstream tasks of interest such as action recognition and behaviour prediction. The provided techniques can save costs and time of providing annotations for large scale video datasets, and can prevent errors in the labelling process.

Optionally, the joint predictability of past and future may be approximated as a contrastive loss for the present feature representation. In a contrastive loss, one or more differences may be computed between the feature representation and one or more so-called positive comparative examples for the present feature representation. The differences for these positive examples may then be compared to one or more differences between the feature representation and one or more negative comparative examples for the present feature representation. For example, an Info-NCE (Noise Contrastive Estimation) loss may be used. The contrastive loss may encourage the feature representation to have smaller differences to positive comparative examples than to negative comparative examples.

In order to capture the joint predictability of the past and future subsequences, a positive example may be extracted from the past subsequence followed by the future subsequence; and this positive example may be compared to a set of negatives that includes a negative example in which the roles of the predictability future and past subsequences are swapped.

Because the negative example is based on the same past and future subsequences as the positive example, but in a different order, it is a challenging example that strongly forces the model to consider temporal aspects. Generally, it is important to include such challenging examples in a contrastive loss in order to obtain an effective training signal. This is because otherwise the model may use shortcuts such as low-level statistics, edges, etc. By using the right order of past and future as a positive example and the reversed order as a negative example, the training signal may force the feature extractor to distinguish between past and future without taking shortcuts. Still, the distinction is effectively made in an implicit way, in the sense that the removal of meaningful features is not needed. The feature extract thus may be encouraged to encode temporal structure shared across the video such that matching temporal orders can be detected.

The positive and negative examples may both be extracted from the past and future subsequences using the same trainable model; however, this model does not need to be the video feature extractor itself. In particular, it can be a separate model that is trained simultaneously with the video extractor, e.g., whose parameters are also updated based on the training signal, as also described elsewhere.

Optionally, a further negative comparative example for the contrastive loss may be extracted from first and a second further subsequences of another training video sequence. Accordingly, the features of future and past may be encouraged to be distinguishable from random as well as each other, given the present observations. The further negative comparative example may be regarded as an easy negative, whereas the negative comparative example extracted from the future subsequence followed by the past subsequence, as described above, may be regarded as a hard negative. The combination of easy and hard negatives in training is particularly advantageous for encouraging the feature extractor to explore the temporal structure of the videos more intensively.

By comparing the joint (positive examples) and product of the marginals of present and future/past distributions (negative examples), the contrastive loss may approximate the mutual information between the feature representation of the present subsequence, and feature representations of the past and future subsequences (extracted by respective models), and in that sense represent a joint predictability. It is also possible however to use other techniques for approximating mutual information, e.g., mutual information estimation (MIE), or to e.g., estimate a conditional entropy of past and future given the present feature representation.

Optionally, applying the video feature extractor to a video sequence may comprise applying a blockwise feature extractor to respective fixed-length blocks of one or more image frames of the video sequence to extract respective block feature representations. The blockwise feature extractor may preserve a spatial and/or temporal relationship, e.g., a feature of the blockwise feature extractor may correspond to a particular spatial and/or temporal location in the block. For example, the blockwise feature extractor may be a 3-D convolutional neural network, examples of which are conventional. The block feature representations may be aggregated by an aggregation function to obtain the feature representation of the video sequence. Applying the same blockwise feature extractor across blocks and then aggregating the results is found to be a particularly effective way of extracting features from video, because it effectively combines a re-usable component that extracts features at the lowest level with an aggregation function that can extract more high-level, e.g., temporal, aspects. The aggregation function can for example be a recurrent model, which is beneficial for allowing the video extractor to operate on variable-length video sequences.

Optionally, during training, the same blockwise feature extractor may also be used to extract positive and negative comparative examples. In particular, the blockwise feature extractor may be applied to the past and future subsequences to extract respective block feature representations of block(s) of the past and future subsequences. If using, the blockwise feature extractor may be applied to the further subsequences of further training video sequences as well. The comparative examples may be extracted from the block feature representations using an aggregation function. This can be the same aggregation function that is also used in the video feature extractor, but, interestingly, the inventors found that in many cases training works better if a separately trained aggregation function is used.

Optionally, the combined length of the past and future subsequences may be smaller than the length of the present subsequence. In particular, the present subsequence may comprise multiple blocks, e.g., at least four, whereas the past and future subsequences may each comprise a single block. Keeping the past and future subsequences short has the advantage that it becomes harder to distinguish between the positive comparative example and the negative comparative example, thus encouraging the model to learn more temporal aspects from the available information. It is noted that it is not needed to keep the length of the present subsequence constant throughout training, and also for the past and future subsequences, in principle their lengths can vary.

Optionally, applying the video feature extractor to a video sequence may comprise applying a convolutional model, in particular a convolutional recurrent model, as an aggregation function to the block feature representations extracted from the video sequence. The convolutional recurrent model may preserve spatial and/or temporal relations. Accordingly, the convolutional recurrent model may output a convolutional feature map. This convolutional feature map may optionally be pooled along at least its spatial dimensions, resulting in spatially independent features that are not associated with a particular spatial location in the video. If the convolutional feature map has a temporal dimension, it may optionally be pooled along this dimension as well to obtain features that are not associated with a particular temporal location in the block.

As an alternative to using a convolutional model and applying pooling to its outputs, it is also possible to apply pooling to the block feature representations and then applying a non-convolutional model as an aggregation function.

In either case, interestingly, a feature representation may be extracted from a video sequence that is invariant to spatial locations. This is in contrast for example to the approach of T. Han et al., "Video Representation Learning by Dense Predictive Coding," in which spatial negatives are used to learn features that are variant to the spatial location. A disadvantage of this other approach is that feature vectors are encouraged to represent local descriptors. The feature vectors should be distinguishable across spatial locations of the feature map since they are injected as negatives in the loss function. Especially in later layers of the model where its receptive field grows, a global feature is favourable. The inventors found experimentally that using features that are invariant to the spatial location, as opposed to space-invariant features trained using spatial negatives, improves transfer to various downstream tasks in which the video feature extractor may be applied, for example, action learning.

Optionally, when selecting the present, past, and future subsequences, respective spatial transformations may be applied to these subsequences. Accordingly, the feature representation of the present subsequence and/or the positive and negative comparative examples may be based on respectively transformed subsequences. This further encourages the model to learn features of the video that are invariant to the spatial dimension, which is beneficial for various downstream tasks. The spatial transformations that are applied to the past, present, and future are preferably all distinct, to more strongly encourage the model to reason about features in a location-independent way.

Optionally, a sampling rate of the training video sequence may be downsampled prior to selecting the present, past, and future subsequences, for example, according to a randomly selected downsampling rate. The downsampling may be performed consistently across the training video sequence. This way, the training dataset can be augmented, allowing the model to be trained on more data. The inventors were able to experimentally verify a performance improvement due to downsampling.

Optionally, having trained the video feature extractor on the unlabelled training data in an unsupervised way, the video feature extractor may be used as part of a further machine learning model. The further machine learning model may be trained on labelled training data, wherein the further machine learning model is configured to determine a model output from a video sequence based on extracting a feature representation of the video sequence using the video feature extractor. For example, the further machine learning may be a video classification model, e.g., an object detection model or a temporal segmentation model. Training the further machine learning model may comprise fine-tuning the video feature extractor, e.g., optimizing parameters of the video feature extractor as part of training the further machine learning model.

Optionally, the video feature extractor may be comprised in a machine learnable control model for a computer-controlled system which is configured to interact with an environment. The video sequence may comprise a video-based representation of the computer-controlled system and/or the environment. For example, the video-based representation may represent aspects of parameters of the system and/or environment, e.g., may capture components of the computer-controlled system and/or objects in the environment of the system. The machine learnable control model, including the trained video feature extractor, may be applied to obtain control data for use in controlling the computer-controlled system, for example, using an actuator or the like. Similarly, monitoring of the computer-controlled-system is possible as well. For example, the computer-controlled system may be a vehicle, e.g., an autonomous or semi-autonomous vehicle; a robot; a manufacturing machine; a domestic appliance; a power tool; a personal assistant; an access control system; etc. Such systems benefit greatly from improved control due to more high-quality video feature extraction.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present disclosure.

BRIEF DESCRIPTION OF THE DRAWINGS

These and other aspects of the present invention will be apparent from and elucidated further with reference to the embodiments described by way of example in the following description and with reference to the figures.

FIG. 6 shows a computer-implemented unsupervised learning method, in accordance with the present invention.

FIG. 7 shows a computer-implemented method of extracting features, in accordance with the present invention.

FIG. 8 shows a computer-readable medium comprising data, in accordance with the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
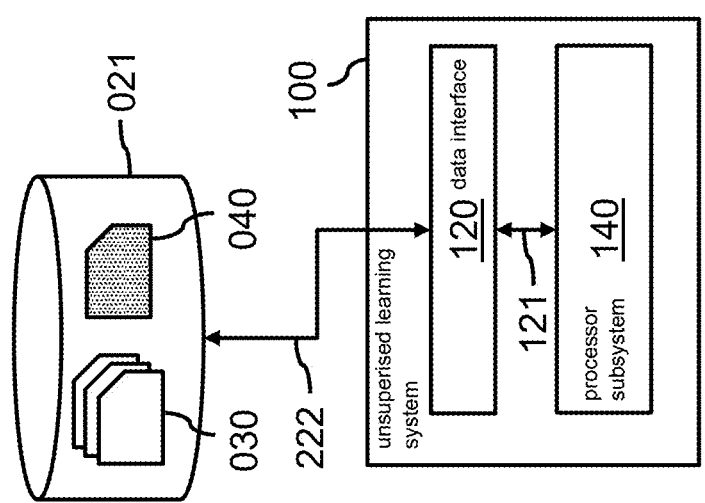
FIG. 1 shows a system for training a video feature extractor, in accordance with an example embodiment of the present invention.

FIG. 1 shows an unsupervised learning system 100 for training a video feature extractor. The video feature extractor may be configured to extract a feature representation from a video sequence. The system 100 may comprise a data interface 120 for accessing training data 030 representing multiple training video sequences. The video feature extractor is a machine learnable model parameterized by a set of parameters. Data interface 120 may also be for accessing model data 040 representing the set of parameters of the video feature extractor. Data interface may also be for accessing model data of models for use in the unsupervised learning, e.g., models for deriving positive and negative comparative examples as described herein. Such models may be optimized as part of the training but may not form part of the video feature extractor 040. The model data 040 may be for use in extracting a feature representation from a video sequence according to a method described herein, e.g., by system 200 of FIG. 2 or of FIG. 3.

The video feature extractor may be comprised in a further machine learning model that uses the feature representation extracted by the video feature extractor. Model data 040 may also comprise additional parameters of the further machine learning model. Data interface 120 may also be for accessing labelled training data (not shown) for training the further machine learning model. The labelled and unlabelled data may overlap, e.g., labels may be available for a subset of training data 030. In such cases, interestingly, training the video feature extractor on the full training data and the remainder of the further machine learning model only on the labelled data may lead to better performance than just training the full further machine learning model on labelled data without separately training its video feature extractor.

Figure 2:
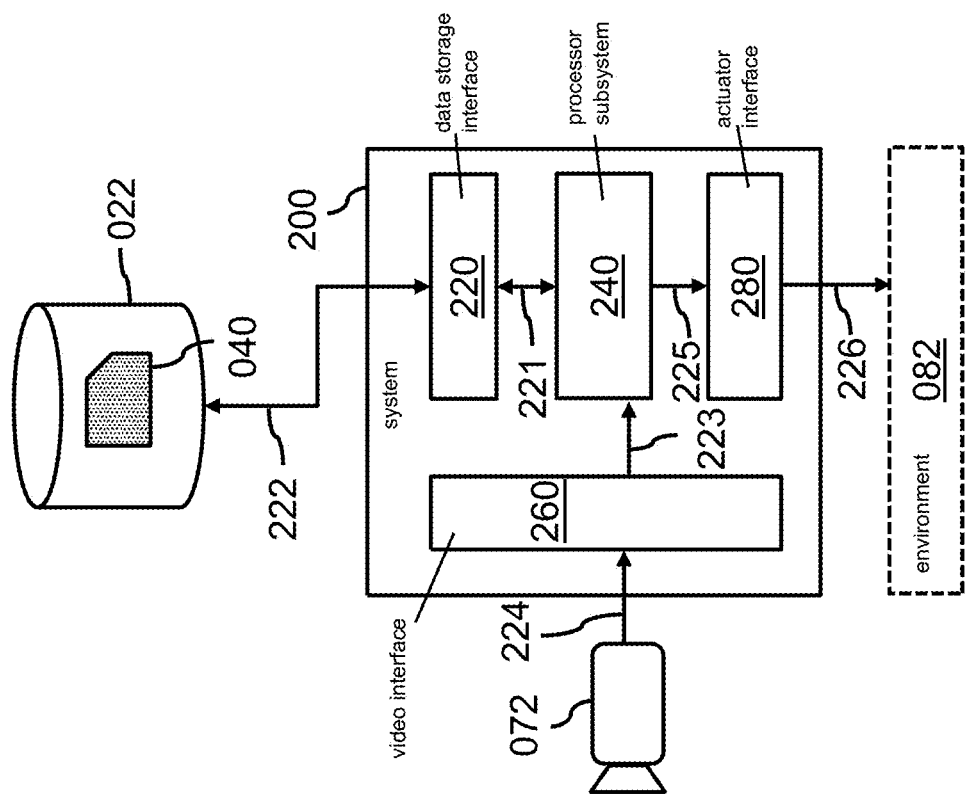
FIG. 2 shows a system for extracting a feature representation from video, in accordance with an example embodiment of the present invention.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120. The data interface for accessing the training video sequences may also comprise a video interface for accessing video sequences from a camera, e.g., as described w.r.t. FIG. 2.

The system 100 may further comprise a processor subsystem 140 which may be configured to, during operation of the system 100, train the video feature extractor and output the trained video feature extractor. The training may comprise selecting from a training video sequence of the multiple training video sequences 030: a current (also called: present) subsequence, a preceding (also called: past) subsequence preceding the current subsequence; and a succeeding (also called: future) subsequence succeeding the current subsequence. The training may further comprise applying the video feature extractor 040 to the current subsequence to extract a current feature representation of the current subsequence. The training may further comprise deriving a training signal from a joint predictability of the preceding and succeeding subsequences given the current feature representation. The training may further comprise updating the set of parameters of the video feature extractor based on the training signal.

In case the video feature extractor is comprised in a further machine learning model, the processor subsystem 140 may be further configured to, following the training of the video feature extractor, train the further machine learning model on labelled training data, based on the trained parameters of the video feature extractor. The video feature extractor may be fine-tuned during this training, but can also be kept unchanged. The further machine learning model may determine its output based on the extracted feature representation, e.g., using a neural network or a linear model.

The system 100 may further comprise an output interface for outputting model data 040 representing the learned (or 'trained') video feature extractor. For example, as also illustrated in FIG. 1, the output interface may be constituted by the data interface 120, with said interface being in these embodiments an input/output ('IO') interface, via which the trained model data 040 may be stored in the data storage 021. For example, the model data defining the 'untrained' video feature extractor may during or after the training be replaced, at least in part, by the model data of the trained video feature extractor, in that the parameters of the video feature extractor, such as weights and other types of parameters of neural networks, may be adapted to reflect the training on the training data 030. In other embodiments, the trained model data may be stored separately from the model data defining the 'untrained' dynamics model. In some embodiments, the output interface may be separate from the data storage interface 120, but may in general be of a type as described above for the data storage interface 120.

FIG. 2 shows a system 200 for extracting a feature representation from a video sequence. The system 200 may comprise a data interface for accessing model data 040 representing a video feature extractor trained as described herein, e.g., by system 100 of FIG. 1 or as described elsewhere. The system 200 may train the video feature extractor 040 in addition to applying it, e.g., system 200 may be combined with system 100 of FIG. 1.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for data interface 120 and data storage 021. The data interface may also be for accessing a video sequence captured by a camera; in this figure, however, the video sequence is received from the camera itself, as discussed below.

The system 200 may further comprise a processor subsystem 240 which may be configured to, during operation of the system 200, obtain a video sequence; apply the video feature extractor 040 to the video sequence to extract a feature representation; and output the feature representation.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a video interface 260 for directly accessing a video sequence 224 acquired by a video camera 072. For example, the video camera may capture a video of a computer-controlled system controlled by system 200, such as an autonomous vehicle or a robot; and/or of an environment 082 with which the computer-controlled system interacts. The video camera 072 may be arranged in environment 082 but may also be arranged remotely from the environment 082. The video camera 072 may but does not need to be part of the system 200. Any suitable video camera may be used, e.g., a visible light camera, an infrared camera, an x-ray camera, etc. The camera can also be a radar, LiDAR, or ultrasonic, or motion detection camera, for example. The sensor data interface 260 may have any suitable form corresponding in type to the type of camera, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) of a computer-controlled system operating in the environment 082. Such control data 226 may be generated by the processor subsystem 240 based on a machine learnable control model that comprises the video feature extractor. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on the feature representation extracted by the video feature extractor. The sensory perceptible output signal may be directly indicative of the extracted features, but may also represent a derived sensory perceptible output signal, e.g., for use in guidance, navigation or other type of control of a computer-controlled system.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Figure 3:
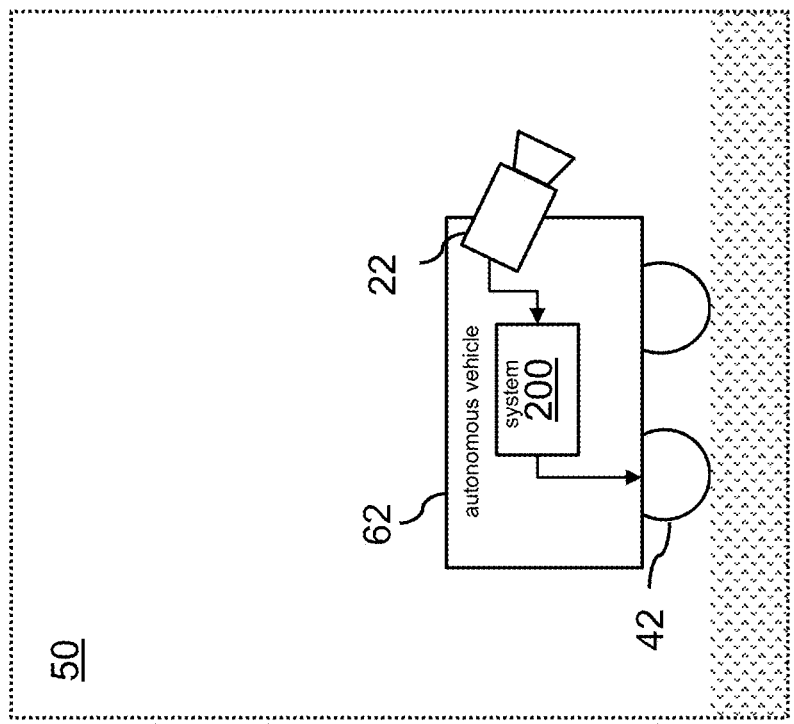
FIG. 3 shows an extraction system being used to control a vehicle, in accordance with an example embodiment of the present invention.

FIG. 3 shows an example of the above, in that the system 200 is shown to be a control system of an (semi-)autonomous vehicle 62 operating in an environment 50. The autonomous vehicle 62 may be autonomous in that it may comprise an autonomous driving system or a driving assistant system, with the latter also being referred to as a semiautonomous system. The autonomous vehicle 62 may for example incorporate the system 200 to control the steering and the braking of the autonomous vehicle based on video sequences obtained from a video camera 22 integrated into the vehicle 62. For example, the system may apply a further machine learnable model that the uses the feature representation extracted by the video feature extractor to determine a model output. This model output may then be used to control the vehicle 62.

For example, the system 200 may control an electric motor 42 to perform (regenerative) braking in case the autonomous vehicle 62 is expected to collide with a traffic participant. The system 200 may control the steering and/or braking to avoid collision with the traffic participant. For that purpose, the system 200 may extract a feature representation from the captured video sequence, and use that extracted feature representation in a further machine learning model, e.g., a temporal segmentation model or a classification model, that is used to detect an increased risk of collision. In case of such an increased risk, the system 200 may take corresponding action.

Figure 4:
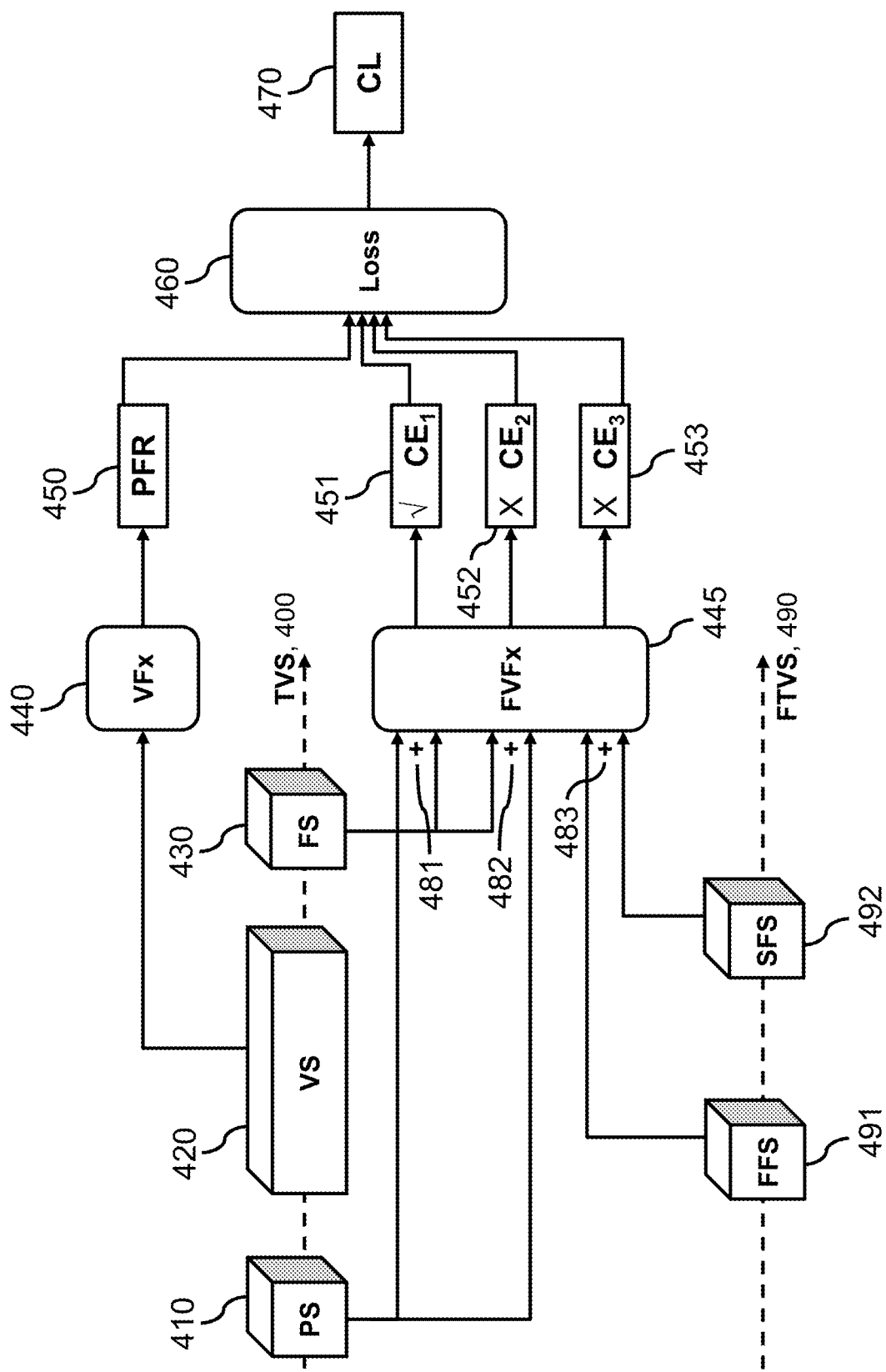
FIG. 4 shows a detailed example of how to train a video feature extractor, in accordance with the present invention.

FIG. 4 shows a detailed, yet non-limiting, example of how a video feature extractor can be trained by unsupervised learning. In this example, a training signal is derived from a joint predictability of past (i.e., preceding) and future (i.e., succeeding) subsequences given a present feature representation by using a contrastive loss.

The figure shows a video feature extractor VFx, 440. Video feature extractor VFx may be configured to extract a feature representation from a video sequence. A video sequence may be a sequence of one or more image frames, wherein each image frame may be an image comprising of one or more channels, e.g., a one-channel greyscale image, or a three-channel image such as an RGB image or the like, etc. For example, the images may have width and/or height at most or at least 16 pixels, at most or at least 128 pixels, or at most or at least 256 pixels. The video feature extractor VFx may support flexible-length video sequences or only fixed-length video sequences, e.g., of at most or at least 10 frames, at most or at least 20 frames, or at most or at least 40 frames. For example, the frame rate of the video can be at most or at least 4, or at most or at least 8 frames per second. The length of the input video sequence may be between 0 and 10 seconds, e.g., between 0 and 2 seconds, e.g., between 0.1 and 1 second. Various conventional video feature extractors VFx can be trained according to the methods described herein; particularly beneficial architectures are described throughout.

The video feature extractor VFx may be parameterized by a set of parameters. Training the video feature extractor may involve optimizing the set of parameters with respect to an objective function. For example, the video extractor VFx may comprise one or more neural networks. Neural networks are also known as artificial neural networks. Examples include deep neural networks and convolutional neural networks. In this case, the set of parameters may comprise weights of nodes of the neural network. For example, the number of layers of such a neural network may be at least 5 or at least 10, and the number of nodes and/or weights may be at least 1000 or at least 10000.

The video feature extractor VFx may be trained based on training data representing multiple training video sequences. For example, the training data may comprise at least 1000, at least 10000 or at least 100000 video sequences. The video sequences can have arbitrary lengths that can also vary from video sequence to video sequence.

To train the model, a training video sequence TVS, 400, may be selected from the training dataset. The training video sequence TVS is visualized in the figure as a timeline, going from past to future, from which respective subsequences are selected. Various augmentations may be applied to increase the number of available video sequence. For example, it was found to be beneficial to augment the training dataset by random downsampling of the frame rate of training video sequences. For example, when selecting a training video sequence, a random downsampling factor may be chosen and the training video may be downsampled according to the chosen factor. Downsampling can also be performed before the training. Other augmentations that can be applied include spatial transformations, e.g., cropping and horizontal flipping; and frame-wise transformations, e.g., frame-wise colour jittering to disrupt optical flow. The downsampling is typically performed on the whole training video sequence TVS. Other augmentations can be applied to the whole video sequence TVS but may also be applied to respective subsequences of it, as also discussed with respect to FIG. 4.

From the training video sequence TVS, a present subsequence VS, 420 of adjacent frames may be selected. The video feature extractor VFx may be applied to this present subsequence VS, thus obtaining a present feature representation PFR, 450. Depending on the chosen feature video feature extractor, the present feature representation PFR can be a feature vector, e.g., consisting of spatially and temporally independent features, e.g., of length at most or at least 64 features, at most or at least 256 features, or at most or at least 2048. The present feature representation PFR can however also comprise features that spatially and/or temporally correspond to the present video sequence VS.

The training may be for optimizing the way the video feature extractor VFx extracts feature representation PFR from present subsequence VS. Thus, a goal of the training may be to produce high-quality, meaningful features PFR. The training may be unsupervised: there may not be target values for the features PFR given as input to the training.

Instead, the training may derive a loss for features PFR based on a pretext task: a task that is expected to encourage the video feature extractor VFx to output high-quality features (so-called self-supervised learning). The pretext task in this case may involve the estimation of a joint predictability of past and future subsequences given the present feature representation PFR, in other words, a predictability of the joint distribution of past and future subsequences given the present feature representation. (It is noted that estimating predictability does not mean that an explicit prediction is made based on the present feature representation; instead, in this example, the present feature representation may be compared to representations of past and future to estimate their correspondence.)

Specifically, the joint predictability may be estimated by determining a contrastive loss CL, 470. In the contrastive loss CL, the present feature representation PFR may be compared to positive and negative comparative examples, where the loss encourages the present feature representation to be more similar to the positive comparative examples than to the negative comparative examples. The positive and negative examples in this case are ordered pairs of video subsequences and are accordingly also referred to herein as "positive pairs" and "negative pairs".

To obtain positive and negative pairs, the training video sequence TVS may be partitioned into three parts X=(P,V,F), where V denotes the present video sequence VS, and P and F denote all frames in the video sequence preceding and succeeding the present video sequence, respectively. Based on this partitioning, positive and negative pairs for the contrastive loss may be constructed by exploiting the joint representations of (P,F).

In particular, given the training video sequence TVS, a set $\mathcal{P}$ of positive pairs may be constructed. For each positive pair $(P,F) \in \mathcal{P}$, a set D(P,F) may be constructed comprising the positive pair itself and all its negatives. As explained elsewhere, a contrastive loss contribution for the positive pair may be determined based on the positive pair and its corresponding set of negative pairs. The overall contrastive loss may be obtained by combining the respective contrastive loss contributions for the respective positive pairs.

In particular, the sets of positive and negative pairs may be constructed as follows.

Positives. $\mathcal{P}$ denotes a set of positive past/future subsequences. A positive pair for a present subsequence VS may be obtained by selecting a random past subsequence PS, 410 of adjacent frames from the set of frames P preceding the present subsequence VS, and selecting a random future subsequence FS, 430 of adjacent frames from the set of frames V succeeding present subsequence VS. Thus, past subsequence PS followed by future subsequence FS may form a positive pair 481. Typically, the past and future subsequences PS, FS have both have the same length.

The past and future subsequences PS, FS are preferably relatively close in the video sequence to the present subsequence VS, for example, at most two or at most five times the length of the present subsequence away. Their total length may be chosen to be smaller than the length of the present subsequence VS so as not to make the pretext task too easy. However, each of the past and future subsequences typically comprises multiple frames to make sufficient temporal inference possible. For example, a set P of m non-overlapping subsequences immediately preceding the present subsequence may be combined with a set F of m non-overlapping subsequences immediately succeeding the present subsequence to obtain $m^2$ positive pairs for the present subsequence VS.

Easy negatives. Easy negatives may be obtained by sampling a first further subsequence FFS, 491, and a second further subsequence SFS, 492, from further training video sequences FTVS, 490. For example, the further training video sequence FTVS can be another video sequence of a batch currently being processed. For example, the video FTVS may be divided into m non-overlapping subsequences. An easy negative may be formed by sampling a possible combination of a such subsequences, either in the right temporal order or in the swapped temporal order. The time distance between the further first and second subsequences FFS, SFS may be selected similarly to that between the past and future subsequences PS, FS. For example, from a batch with n videos each comprising m non-overlapping subsequences, $2m^2(n-1)$ easy negatives may be obtained.

Temporal hard negatives. A temporal hard negative may be obtained by swapping the order of past and future of the corresponding positive pair. Thus, for a positive pair 481 in which a past subsequence PS precedes a future subsequence FS, a corresponding temporal hard negative 482 may be obtained in which the past subsequence PS succeeds the future subsequence FS. The set of negatives for a positive pair at least comprises the corresponding temporal negative, but it can also comprise temporal hard negatives for other positive pairs from the same training video sequence TVS.

For example, a set of positive and negative pairs may be obtained as follows. A batch of n video sequences may be selected. From each video, a present subsequence, m past subsequences, and m future subsequences may be selected (for example, m blocks immediately preceding and succeeding the present subsequence). For each video, this gives $m^2$ positive pairs by combining each of the m past subsequences with each of the m future subsequences. For each positive pair, a corresponding temporal hard negative pair may be obtained. By taking combinations of past and future subsequences of the other further video subsequences in the block, $2m^2(n-1)$ easy negatives may be obtained. This full set of positive and negative pairs can be used for the contrastive loss, although it is also possible to use only a subset of the positive and/or of the negative pairs.

For example, in an embodiment, 8 blocks of 5 frames each may be extracted from a video sequence TVS and split them in the following way: the 4 middle blocks are used as present video sequence VS, single past and future blocks at different temporal distances to the present from the remaining blocks are sampled as past and future subsequences PS, FS. In this example, a training video sequence TVS may provide 4 positive pairs per video and 4 corresponding negative pairs.

Various other numbers of blocks per past, present, and future subsequence are also possible (for a given block length, e.g., 5 frames per block). For example, experiments were performed with a number of past, present, and future blocks of (2,4,2); (3,2,3); (2,2,2); (1,2,1); and (2,1,2), where the present subsequence contains all present blocks and pairs of single past and future blocks provide the positive and negative pairs. A larger number of future and past blocks allows to provide the contrastive loss with a larger set of positive and negative pairs. For instance, (2,4,2) provides 4 positive and negatives pairs per video in a batch. (3,2,3) increases the difficulty of the task as more temporal hard negatives are included in the loss function while the temporal receptive field of the present sequence is reduced. In the experiments performed, it was found that reducing the number of present blocks while keeping the past and future blocks fixed may not change the quality of the representations significantly. However, reducing the number of future and past blocks to only one positive pair per video, e.g., (1,2,1), or reducing the number of present blocks to one, e.g., (2,1,2), was found to reduce performance. The former reduces the number of temporal hard negatives which leads to a simpler task, while the later limits temporal information. Accordingly, it is preferred to select multiple positive pairs per present video sequence VS and to select present video sequences VS of multiple blocks. The experiments indicate that temporal hard negatives improve feature extraction, and show that the obtained feature extractor can exploit temporal information.

Figure 5A:
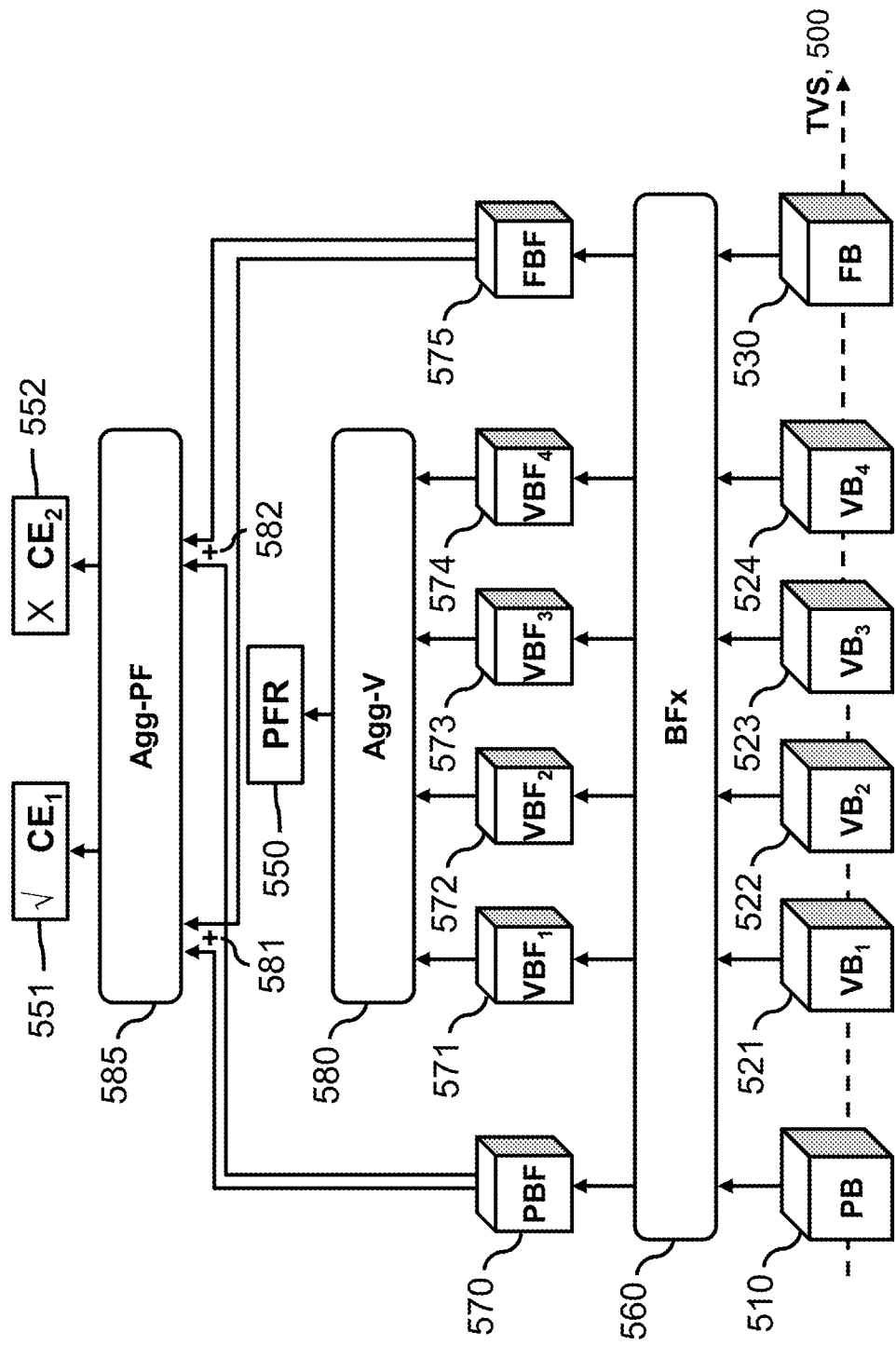
FIG. 5A shows a detailed example of how to extract representations, in accordance with the present invention.

As shown in the figure, positive and negative comparative examples may be extracted for the positive and negative pairs by applying a further video feature extractor FVFx, 445 to the pairs of past and present subsequences. For example, from the positive pair 481 of the past subsequence PS followed by the future subsequence FS, a positive comparative example CE1, 451 may be extracted. Similarly, negative pairs 482, 483 may lead to negative comparative examples CE2, 452, and CE3, 453, respectively. The further video feature extractor FVFx can coincide with the video feature extractor VFx, 440, but interestingly, the inventors found that it is beneficial to use a further video feature extractor FVFx that is separate from but trained jointly with the video feature extractor VFx. This may be explained by the fact that the inputs of the further video feature extractor FVFx are different from that of the video feature extractor VFx: typically with a different length and at least with two temporally distant parts. The video feature extractor VFx and further video feature extractor FVFx can however have parts, e.g., neural network layers, in common, as also illustrated in FIG. 5A.

Based on the extracted present feature representation VFx and its positive and negative comparative examples CEi, a loss computation Loss, 460, may be performed to determine contrastive loss CL. Specifically, to compute the contrastive loss CL, the present feature representation VFx may be compared to the positive and negative comparative examples CEi to compute respective similarities to the respective comparative examples. The contrastive loss may encourage similarity, e.g., small distance, to positive comparative examples CE1 and discourage similarity to negative comparative examples CE2, CE3.

As similarity measure, for example, cosine similarity may be used, e.g., $$\sin(u, v) = \frac{u^T v}{\|u\|\|v\|},$$

although other similarity measures such as soft cosine similarity are also possible. Optionally, the similarity measure may be applied not directly to feature representations $z_v$, end $z_{pf}$ themselves, but to outputs of respective trainable functions $f_v(z_v)$, $f_{pf}(z_{pf})$ applied to the feature representations, for example a non-linear trainable function such as a shallow NLP, e.g., comprising one or two layers. These functions are typically trained jointly with the video feature extractor. Using trainable functions was found to improve performance by increasing flexibility in the computation of the similarity.

As a contrastive loss function, a noise contrastive estimation loss may be used, in particular an InfoNCE loss. Combined with applying a temperature parameter x, for example, the loss may be computed as follows:

$$\mathcal{L} = \sum_{(P,F) \in \mathcal{P}} -\log\left(\frac{\exp(sim(f_v(z_v), f_{pf}(z_{pf}))/\tau)}{\sum_{(P',F') \in \mathcal{D}_{(P,F)}} \exp(sim(f_v(z_v), f_{pf}(z_{p'f'}))/\tau)}\right).$$

Here, sim denotes cosine similarity, $f_v$ and $f_{pf}$ are trainable functions, e.g., small MLP heads, and $\tau$ is a temperature parameter. The positive pair is in the nominator. The sum in the denominator is taken over the set of negative pairs and additionally includes the positive pair. Minimizing this loss maximizes the similarity of the positive pair and minimizes the similarity of the negative pairs.

As is conventional, the InfoNCE loss provides a lower bound of the mutual information. From this point of view, minimizing the contrastive loss shown above can be interpreted as maximizing mutual information between the present feature representation PFR extracted by the video feature extractor VFx, and features extracted by the further video feature extractor FVFx from pairs of past and future:

max $I(\varphi(V),\varphi(P,F))$. In order to most accurately approximate the mutual information, negative pairs may be selected by sampling from the product of the marginals. Interestingly, although selecting a combination of easy and temporal hard negatives as described instead of sampling directly from this product of marginals may provide a less accurate approximation of the mutual information, it has been found to provide a stronger training signal and thus contribute more to the quality of the learned representations.

The contrastive loss CL may be used to derive a training signal to update the parameters of the video feature extractor VFx. Also any trainable parameters of the further video feature extractor FVFx and/or the contrastive loss computation Loss may be updated based on the training signal. For example, the training signal may be derived from an objective function that includes the contrastive loss. Various conventional training techniques for optimizing an objective function may be used, for example gradient descent, in particular stochastic gradient descent. For example, the Adam optimizer may be used, as disclosed in Kingma and Ba, "Adam: A Method for Stochastic Optimization" (available at https://arxiv.org/abs/1412.6980 and incorporated herein by reference). Such optimization methods may be heuristic and/or arrive at a local optimum. Training may be performed on an instance-by-instance basis or in batches, e.g., of at most or at least 64 or at most or at least 256 instances. In batch-wise training, for example, a training video sequence may be selected from the batch and further negative comparative examples can be extracted from other video sequences of the batch. Specifically, experiments were performed using Adam with a learning rate of $10^{-3}$ and a weight decay of $10^{-5}$. The learning rate may be reduced, e.g., by a factor of 10 when the validation loss plateaues.

FIG. 5A shows a detailed, yet non-limiting, example of how to extract a feature representation and comparative examples. This example highlights architectural choices for the video feature extractor and further video feature extractor that have been found to work particularly well with the training techniques described herein. For example, the techniques described with respect to this figure can be used in combination with the training of FIG. 4.

Shown in the figure is a training video sequence TVS, 500. From the training video sequence TVS, a present subsequence, a past subsequence preceding the present subsequence, and a future subsequence succeeding the present subsequence may be selected.

In the example illustrated by this figure, the past, present, and future subsequence are each divided into one or more adjacent fixed-length blocks. The length of the blocks of all the subsequences are the same, e.g., a block may comprise at least two, at most or at least five, or at most or at least ten frames.

In this example, the past subsequence is shown to comprise a single block PB, 510. Also the future subsequence in this example comprises a single block FB, 530. The present subsequence in this example comprises four blocks VB1, 521; VB2, 522; VB3; 523; and VB4, 524. These numbers of blocks are for illustration purposes only. However, having single past and future blocks and multiple present blocks is a good choice since it prevents the pretext task for training from becoming too simple while at the time providing enough information about the present subsequence to perform temporal reasoning. More generally, the combined number of past and future blocks may be at most equal to, or even strictly smaller than, the number of present blocks. The number of present blocks can be at most or at least two, at most or at least four, or at most or at least ten, for example. More possibilities for the number of blocks per subsequence are discussed with respect to FIG. 4.

As shown in the figure, a blockwise feature extractor BFx, 560, may be applied to respective blocks of the past, present, and future subsequences. As a result, respective block feature representations may be extracted, e.g., block feature representation PBF, 570, of the past block PB; respective block feature representations VBF1, 571; VBF2, 572; VBF3, 573; and VBF4, 574 of respective present blocks VB1, VB2, VB3, VB4; and block feature representation FBF, 575 of future block FB. The blockwise feature extractor BFx is preferably trained as part of training the video feature extractor. Interestingly, the same blockwise feature extractor BFx may be applied to the past, present, and future blocks, so that the blockwise feature extractor BFx can be trained on more data and the task of computing the comparative loss can be performed better. It is also possible however to use separate blockwise feature extractors for the present on the one hand and the past and future on the other hand.

The blockwise feature extractor BFx preferably preserves at least the spatial relations of its inputs. That is, the block feature representation may have spatial dimensions that correspond to those of its input or a scaling thereof. The blockwise feature extractor does not need to preserve the temporal dimension, however. The blockwise feature extractor typically take a fixed-size input, e.g., a given number of frames of a given size. For example, an input block may have dimensions 5×128×128×3: 5 frames of 128×128 pixels with 3 RGB channels. Applying the blockwise feature extractor may for example result in a block feature representation with dimensions 4×4×256, where 4×4 corresponds to the spatial locations, 256 is the number of channels, and there is no temporal dimension.

For example, the blockwise feature extractor may be a 3D convolutional neural network (3D-CNN), e.g., a neural network that comprises 3D-convolutions that are applied convolutionally across spatial and temporal dimensions of the input video block. As a concrete example, a 2D-3D version of ResNet18 may be used in which 3D convolutions are applied in the last two layers. It is also possible to use a blockwise feature extractor that uses 3D convolutions in all its layers, e.g., the R3D architecture that is conventional.

Accordingly, for example, by applying the blockwise feature extractor BFx to a present subsequence of n blocks, n feature maps VBFi output by the blockwise feature extractor may be obtained. The individual feature maps may not have a temporal dimension, but the sequence of feature maps VBFi may be regarded as the temporal dimension, e.g., the output of the blockwise feature extractor for a sequence of multiple blocks may be regarded as a volume with a temporal dimension, e.g., size n×4×4×256.

Based on the extracted blocks, a present feature representation PFR, 550 of the present subsequence VB1-VB4 may be derived by applying a trainable aggregation function Agg-V, 580. Similarly, based a positive pair 581 in which the block feature representations of the past subsequence PBF precede the block feature representations of the future subsequence FBF, a positive comparative example CE1, 551 may be derived by applying a further trainable aggregation function Agg-PF, 585, and similarly, based on a negative pair 582 with past and future swapped, a negative comparative example CE2, 552 may be derived. The aggregation functions Agg-V, Agg-PF can be the same, but the inventors found it that using separate aggregation functions can provide better results.

For example, as an aggregation function, a convolutional recurrent model can be used, for example, a convolutional recurrent neural network such as a ConvGRU. In such cases, pooling (e.g., average or max pooling) along spatial dimensions may be used to make the features of the feature representation PFR and/or the comparative examples CEi spatially invariant. It is also possible to apply pooling to the inputs of the aggregation function, in which case a non-convolutional recurrent model can be used, e.g., a LTSM or GRU. Generally, recurrent models have the advantage that variable-length inputs, e.g., variable number of blocks, can be used. If this is not needed, it is also possible to use an aggregation model that is configured for fixed-length inputs. For example, the aggregation function Agg-PF may take just two block representations PBF, FBF as input (possibly pooled along the spatial dimensions) and in this case need not be recurrent. For example, the aggregation function Agg-PF can be concatenation.

Figure 5B:
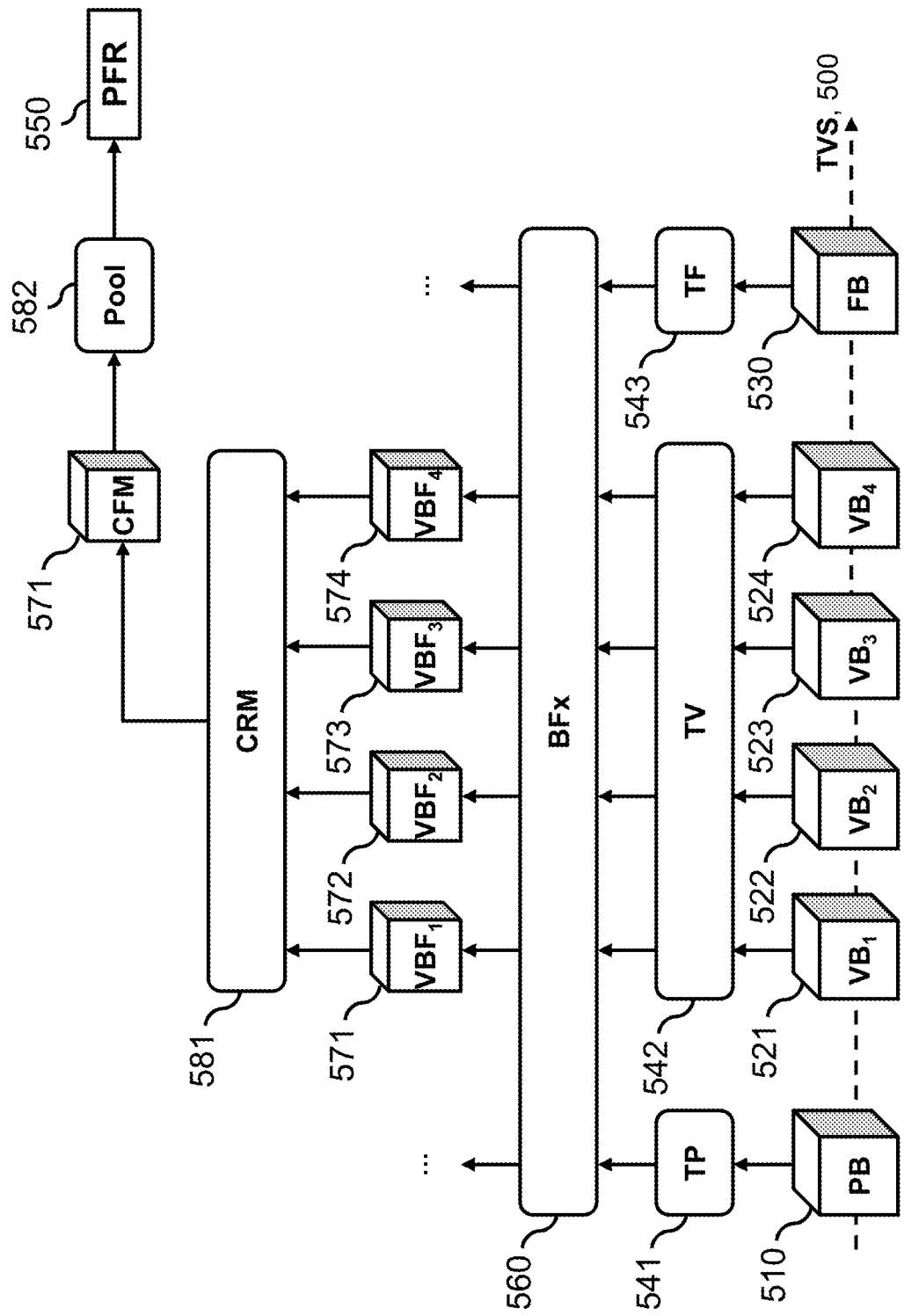
FIG. 5B shows a detailed example of how to extract a feature representation, in accordance with the present invention.

FIG. 5B shows a detailed, yet non-limiting, example of how to extract a feature representation from a video sequence. For example, this example can be combined with FIG. 4 or FIG. 5A. This example demonstrates the use of spatial transformations for data augmentation, and the use of a convolutional recurrent model and pooling for the extraction of spatially independent features. These separate aspects can also be implemented without implementing the other, however.

In particular, the figure shows how, for the purpose of training, respective spatial transformations may be applied to the present, past, and future subsequences of a training video sequence TVS, 500. Similarly to FIG. 5A, in this example, the respective subsequences are divided into fixed-length blocks. As an illustration, in the figure, the past subsequence comprises a single block PB, 510; the present subsequence comprises four blocks VB1, 521; VB2, 522; VB3, 523; and VB4, 524; and the future subsequence comprises a single block FB, 530. The spatial transformations may then be applied blockwise, e.g., a first transformation TP, 541 may be applied to the blocks PB of the past subsequence; a second transformation TV, 542 may be applied to blocks VBi of the present subsequence; and/or a third transformation TF, 543 may be applied to blocks TF of the future subsequence.

For example, an applied transformation may comprise one or more spatial transformations, e.g., one or more of a cropping (e.g., random, horizontal, or vertical) and a flipping (e.g., horizontal or vertical); and/or one or more additional transformations, e.g., a frame-wise colour jittering to disrupt optical flow. The transformation(s) are typically applied consistently to frames in a block and to blocks in a subsequence (although the latter is not needed), but preferably, the transformations TP, TV, and TF applied to the respective subsequences are different in terms of what transformations are applied and/or with which parameters. This has been found to improve the robustness of extracted representations. Corresponding positive and negative comparative examples are typically extracted from the same transformed past and future subsequences, however. The transformations typically do not change the dimensions of their inputs.

After applying the transformations, the feature extractor and the further feature extractor may be applied to extract the present feature representation and the positive and negative comparative examples. This can be done as described with respect to FIG. 5A, for example. In this figure, a particular example of extracting the present feature representation PFR, 550 is shown. Similarly to FIG. 5A, this may involve applying a blockwise feature extractor BFx, 560, to respective blocks of the present subsequence, in this case transformed by transformation TV. This may result in respective block feature representations VBF1, 571; VBF2, 572; VBF3, 573; and VBF4, 574. The same block feature extractor BFx may optionally also be applied to the (in this case, transformed) blocks of the past and future subsequences and further processed to obtain comparative examples, as also discussed with respect to FIG. 5A.

The block feature representations VBFi may have spatial dimensions corresponding to the spatial dimensions of blocks of the video sequence TVS. A block feature representation VBFi may not have a temporal dimension, e.g., may have three dimensions corresponding to 2-D space and a number of features, e.g., size 4×4×256 with 4×4 the spatial dimensions and 256 the number of channels.

As shown in the figure, a convolutional recurrent model CRM, 581, may be applied to the block feature representations VBFi of the present subsequence to obtain a convolutional feature map CFM, 571. Applying the recurrent model CRM may comprise repeatedly updating a state of the recurrent model by inputting respective block feature representations. The state may spatially correspond to the input, and the updating operation may be applied convolutionally along at least the spatial dimensions of the respective block feature representations. For example, the recurrent convolutional model may be a recurrent convolutional neural network, such as Convolutional Gated Recurrent Units (ConvGRU) or the like. Accordingly, a convolutional feature map CFM may be obtained with the same dimensions as a block feature representation, possibly up to scaling, e.g., dimensions of 4×4×256. For example, the convolutional recurrent model may be applied with a spatial kernel of 1 to aggregate the feature maps VBFi along the temporal dimension. Relatively few layers may suffice for the convolutional recurrent model, for example, the number of layers may be one, at most two, or at most five.

In pooling operation Pool, 582, the convolutional feature map CFM may be pooled along at least its spatial dimensions (and possibly temporal dimensions if the convolutional feature map CFM has them). The pooling can be average pooling or max pooling, for example. This way, a feature representation PFR may be obtained with spatially and temporally independent features, e.g., a feature vector. For example, given a 4×4×256-size convolutional feature map CFM, a 256-length feature vector PFR may be obtained.

As an alternative, pooling may be applied before applying a recurrent model, which then does not need to be convolutional. For example, pooling may be applied to the block feature representations VBFi to obtain, e.g., 1×1×256-size representations of blocks, in other words, feature vectors representing respective blocks. These feature vectors may then be processed by a recurrent model to obtain a present feature representation, e.g., also a length-256 feature vector.

Accordingly, the video feature extractor that extracts present feature representation PFR from present subsequence VBi may comprise the block feature extractor BFx; the convolutional recurrent model CRM; and the pooling operation Pool. At least the block feature extractor BFx and the recurrent model CRM may have trainable parameters. The positive and negative comparative examples may be extracted using a further video feature extractor with a similar architecture to the video feature extractor. However, it was found to be beneficial to use separate models, e.g., a convolutional feature map with a different set of parameters may be used for the further video feature extractor.

FIG. 6 shows a block-diagram of a computer-implemented unsupervised learning method 600 of training a video feature extractor. The video feature extractor may be configured to extract a feature representation from a video sequence. The method 600 may correspond to an operation of the system 100 of FIG. 1. However, this is not a limitation, in that the method 600 may also be performed using another system, apparatus or device.

The method 600 may comprise, in an operation titled "ACCESS TRAINING, MODEL DATA", accessing 610 training data representing multiple training video sequences, and model data representing a set of parameters of the video feature extractor. The method 600 may comprise, in an operation titled "TRAIN VIDEO FEATURE EXTRACTOR", training 620 the video feature extractor. The training operation 620 may comprise, in an operation titled "SELECT CURRENT, PRECEDING, SUCCEEDING SUBSEQUENCE", selecting 630 from a training video sequence of the multiple training video sequences: a current subsequence, a preceding subsequence preceding the current subsequence; and a succeeding subsequence succeeding the current subsequence. The training operation 620 may comprise, in an operation titled "APPLY VIDEO FEATURE EXTRACTOR", applying 640 the video feature extractor to the current subsequence to extract a current feature representation of the current subsequence. The training operation 620 may comprise, in an operation titled "DERIVE SIGNAL FROM JOINT PREDICTABILITY OF PAST AND FUTURE GIVEN CURRENT", deriving 650 a training signal from a joint predictability of the preceding and succeeding subsequences given the current feature representation. The training operation 620 may comprise, in an operation titled "UPDATE PARAMETERS", updating 660 the set of parameters of the video feature extractor based on the training signal.

The method 600 may further comprise, in an operation titled "OUTPUT VIDEO FEATURE EXTRACTOR", outputting 670 the trained video feature extractor.

FIG. 7 shows a block-diagram of computer-implemented method 700 of extracting a feature representation from a video sequence. The method 700 may correspond to an operation of the system 200 of FIG. 2 or FIG. 3. However, this is not a limitation, in that the method 700 may also be performed using another system, apparatus or device.

The method 700 may comprise, in an operation titled "ACCESS MODEL DATA", accessing 710 model data representing a video feature extractor trained according to a computer-implemented method described herein, e.g., method 600 of FIG. 6. The method 700 may comprise, in an operation titled "OBTAIN VIDEO SEQUENCE", obtaining 720 a video sequence. The method 700 may comprise, in an operation titled "APPLY VIDEO FEATURE EXTRACTOR", applying 730 the video feature extractor to the video sequence to obtain the feature representation. The method 700 may comprise, in an operation titled "OUTPUT FEATURE REPRESENTATION", outputting 740 the feature representation.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations. Some or all of the methods may also be combined, e.g., method 700 that uses a video feature extractor may be applied subsequently to this video feature extractor being trained according to method 600.

The method(s) may be implemented on a computer as a computer-implemented method, as dedicated hardware, or as a combination of both. As illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing model data representing a set of parameters of a video feature extractor trained according to a computer-implemented method described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments, in view of the disclosure herein, without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the description of a device including several means, several of these means may be embodied by one and the same item of hardware. The mere fact that certain measures are described separately does not indicate that a combination of these measures cannot be used to advantage.

What is claimed is:

1. A computer-implemented unsupervised learning method of training a video feature extractor, wherein the video feature extractor is configured to extract a feature representation from a video sequence, the method comprising the following steps:

accessing training data representing multiple training video sequences, and model data representing a set of parameters of the video feature extractor;

training the video feature extractor by:

selecting from a training video sequence of the multiple training video sequences: a current subsequence, a preceding subsequence preceding the current subsequence; and a succeeding subsequence succeeding the current subsequence;

applying the video feature extractor to the current subsequence to extract a current feature representation of the current subsequence;

deriving a training signal from a joint predictability of the preceding and succeeding subsequences given the current feature representation, wherein deriving the training signal includes extracting a positive comparative example from the preceding subsequence followed by the succeeding subsequence, extracting a negative comparative example from the succeeding subsequence followed by the preceding subsequence, and determining a contrastive loss based on comparing the current feature representation to the positive and negative comparative examples;

updating the set of parameters of the video feature extractor based on the training signal;

outputting the trained video feature extractor.

2. The method of claim 1, further comprising:

extracting a further negative comparative example from a first and second further subsequence of a further training video sequence different from the training video sequence; and using the further negative comparative example for determining the contrastive loss.

3. The method of claim 1, further comprising:

applying a blockwise feature extractor to respective fixed-length blocks of one or more image frames of the current, preceding, and succeeding subsequences to extract respective block feature representations.

4. The method of claim 3, wherein the current subsequence includes multiple blocks and the preceding and succeeding subsequences each comprise a single block.

5. The method of claim 3, wherein the blockwise feature extractor is a 3-D convolutional neural network.

6. The method of claim 3, wherein applying the video feature extractor to the current subsequence includes applying a recurrent convolutional model to the block feature representations of the current subsequence to obtain a convolutional feature map, and pooling the convolutional feature map along at least its spatial dimensions.

7. The method of claim 1, further comprising:

applying respective spatial transformations to one or more of the current, preceding, and succeeding subsequences.

8. The method of claim 1, further comprising:

downsampling a sampling rate of the training video sequence prior to selecting the current, preceding, and succeeding subsequences.

9. The method of claim 1, further comprising:

obtaining labelled training data and training a further machine learning model on the labelled training data, wherein the further machine learning model is configured to determine a model output from a video sequence based on extracting a feature representation of the video sequence using the video feature extractor.

10. A computer-implemented method of extracting a feature representation from a video sequence, the method comprising the following steps:
  accessing model data representing a trained video feature extractor, the video extractor being trained by:
    accessing training data representing multiple training video sequences, and model data representing a set of parameters of the video feature extractor;
    training the video feature extractor by:
      selecting from a training video sequence of the multiple training video sequences: a current subsequence, a preceding subsequence preceding the current subsequence; and a succeeding subsequence succeeding the current subsequence;
      applying the video feature extractor to the current subsequence to extract a current feature representation of the current subsequence;
      deriving a training signal from a joint predictability of the preceding and succeeding subsequences given the current feature representation, wherein deriving the training signal includes extracting a positive comparative example from the preceding subsequence followed by the succeeding subsequence, extracting a negative comparative example from the succeeding subsequence followed by the preceding subsequence, and determining a contrastive loss based on comparing the current feature representation to the positive and negative comparative examples;
      updating the set of parameters of the video feature extractor based on the training signal;
    outputting the trained video feature extractor;
  obtaining a video sequence;
  applying the video feature extractor to the video sequence to obtain the feature representation; and
  outputting the feature representation.

11. The method of claim 10, wherein the video feature extractor is comprised in a machine learnable control model for a computer-controlled system which is configured to interact with an environment, wherein the video sequence comprises a video-based representation of the computer-controlled system and/or the environment, and wherein the method further comprises applying the machine learnable control model to obtain control data for use in controlling the computer-controlled system.

12. An unsupervised learning system for training a video feature extractor, wherein the video feature extractor is configured to extract a feature representation from a video sequence, the system comprising:
  a data interface configured to access training data representing multiple training video sequences, and model data representing a set of parameters of the video feature extractor;
  a processor subsystem configured to train the video feature extractor and output the trained video feature extractor, wherein the training comprises:
    selecting from a training video sequence of the multiple training video sequences: a current subsequence, a preceding subsequence preceding the current subsequence; and a succeeding subsequence succeeding the current subsequence;
    applying the video feature extractor to the current subsequence to extract a current feature representation of the current subsequence;
    deriving a training signal from a joint predictability of the preceding and succeeding subsequences given the current feature representation,
    wherein deriving the training signal comprises extracting a positive comparative example from the preceding subsequence followed by the succeeding subsequence; extracting a negative comparative example from the succeeding subsequence followed by the preceding subsequence; and determining a contrastive loss based on comparing the current feature representation to the positive and negative comparative examples;
    updating the set of parameters of the video feature extractor based on the training signal.

13. A system for extracting a feature representation from a video sequence, the system comprising:
  a data interface configured to access model data representing a trained video feature extractor, the video feature extractor being trained by:
    accessing training data representing multiple training video sequences, and model data representing a set of parameters of the video feature extractor;
    training the video feature extractor by:
      selecting from a training video sequence of the multiple training video sequences: a current subsequence, a preceding subsequence preceding the current subsequence; and a succeeding subsequence succeeding the current subsequence;
      applying the video feature extractor to the current subsequence to extract a current feature representation of the current subsequence;
      deriving a training signal from a joint predictability of the preceding and succeeding subsequences given the current feature representation, wherein deriving the training signal includes extracting a positive comparative example from the preceding subsequence followed by the succeeding subsequence, extracting a negative comparative example from the succeeding subsequence followed by the preceding subsequence, and determining a contrastive loss based on comparing the current feature representation to the positive and negative comparative examples;
      updating the set of parameters of the video feature extractor based on the training signal;
    outputting the trained video feature extractor;
  a video interface configured to obtain a video sequence captured by a camera;
  a processor subsystem configured to, via the video interface, obtain the video sequence; apply the video feature extractor to the video sequence to extract the feature representation; and output the feature representation.

14. A non-transitory computer-readable medium on which is stored data representing instructions for training a video feature extractor, wherein the video feature extractor is configured to extract a feature representation from a video sequence, the instructions, when executed by a processor system, causing the processor system to perform the following steps:
  accessing training data representing multiple training video sequences, and model data representing a set of parameters of the video feature extractor;
  training the video feature extractor by:
    selecting from a training video sequence of the multiple training video sequences: a current subsequence, a preceding subsequence preceding the current subsequence; and a succeeding subsequence succeeding the current subsequence;

applying the video feature extractor to the current subsequence to extract a current feature representation of the current subsequence;

deriving a training signal from a joint predictability of the preceding and succeeding subsequences given the current feature representation, wherein deriving the training signal includes extracting a positive comparative example from the preceding subsequence followed by the succeeding subsequence, extracting a negative comparative example from the succeeding subsequence followed by the preceding subsequence, and determining a contrastive loss based on comparing the current feature representation to the positive and negative comparative examples;

updating the set of parameters of the video feature extractor based on the training signal;

outputting the trained video feature extractor.

* * * * *